United States Patent [19]

Nijhof

[11] 4,437,433
[45] Mar. 20, 1984

[54] POULTRY BROILER CAGE

[75] Inventor: W. A. J. Nijhof, Hattem, Netherlands

[73] Assignee: U. S. Industries, Inc., Stamford, Conn.

[21] Appl. No.: 342,889

[22] Filed: Jan. 26, 1982

[51] Int. Cl.³ .................. A01K 31/00; A01K 31/04
[52] U.S. Cl. ...................................... 119/18; 119/22
[58] Field of Search ................................ 119/18, 22

[56] References Cited

U.S. PATENT DOCUMENTS

| | | | |
|---|---|---|---|
| 2,186,009 | 1/1940 | Clark et al. | 119/17 |
| 2,214,462 | 9/1940 | Hill | 119/17 |
| 2,565,521 | 8/1951 | Ratermann | 119/22 |
| 2,595,392 | 5/1952 | Lalancette | 119/22 |
| 3,464,389 | 9/1969 | Seiderman | 119/22 |
| 3,585,968 | 6/1971 | Stone, Jr. | 119/22 |
| 3,641,983 | 2/1972 | Keen et al. | 119/17 |
| 3,662,714 | 5/1972 | Poon | 119/18 |
| 3,796,189 | 3/1974 | Blondeel | 119/17 |
| 3,875,902 | 4/1975 | Gasper | 119/17 |
| 3,900,006 | 8/1975 | Shockley, Jr. | 119/18 |
| 3,948,219 | 4/1976 | Groppel | 119/17 |
| 3,978,819 | 9/1976 | Lovitt | 119/22 |
| 4,020,793 | 5/1977 | Morrison | 119/18 |
| 4,023,531 | 5/1977 | Thompson | 119/22 |
| 4,148,276 | 4/1979 | Schmidt | 119/18 |
| 4,213,422 | 7/1980 | Nagel et al. | 119/21 |

FOREIGN PATENT DOCUMENTS

| | | |
|---|---|---|
| 2108251 | 10/1971 | Fed. Rep. of Germany . |
| 2555357 | 6/1977 | Fed. Rep. of Germany . |
| 2132084 | 4/1971 | France . |

Primary Examiner—Hugh R. Chamblee
Attorney, Agent, or Firm—Price, Heneveld, Huizenga & Cooper

[57] ABSTRACT

An improved poultry broiler cage comprising a plurality of stacked cage tiers. Each cage tier in turn comprises an elongated confinement area and a poultry-supporting floor movable longitudinally with respect to the confinement area between an operative position and an inverted, lower, inoperative position whereby poultry can be loaded and unloaded into and out of the confinement areas. Each floor is selectively responsive to a driven axle and comprises rails (preferably low friction) secured to opposite sides of the confinement area, a tension pulling member (preferably a chain) rides and is movable longitudinally along each rail. A plurality of spaced support bars extend between and are secured to the pulling members and a flexible floor material extends between the pulling members and preferably are supported in trampoline-like fasion on the support bars. The floor material comprises an open-weave fabric including a plurality of ribs defining a plurality of relatively wider apertures through which droppings can easily pass. Each cage tier includes an access door pivotal about a horizontal axis located between upper and lower portions of the door. The pivot axis is located below the inoperative position of the floor immediately above the door so that when the door is opened to a horizontal position, the upper floor can be moved into and out of its inoperative position, and when the door is closed, poultry cannot escape over the door. The broiler cage further comprises a single motor-driven shaft and a unique clutch for selectively driving each floor with the same motor. Such clutch means includes separate driven members for each floor, such driven members being freely rotatable with respect to its associated axle on which one of the respective floors are mounted. A special clutch member is provided for locking the freely rotatable members to its associated axle for selectively coupling the driven member and its associated axle in fixed angular relationship to selectively move only one of the floors at a time.

24 Claims, 17 Drawing Figures

POULTRY BROILER CAGE

BACKGROUND OF THE INVENTION

The present invention relates to poultry broiler cages, and more particularly to a poultry broiler cage having elongated confinement areas including floors movable longitudinally thereof.

One type of tiered poultry cage includes several elongated confinement areas positioned one directly above the other. Each confinement area includes a floor movable longitudinally with respect to the confinement area. Often the floors are formed into an endless loop configuration so that the floor material is movable between an operative, poultry-supporting position and an inverted, lower, inoperative position. When chicks are to be introduced into a confinement area, that floor is positioned in the inverted, inoperative position and while being moved to the operative position chicks are placed on the belt and thereby carried into the area. Watering and feeding devices are included in the confinement area to support the poultry during confinement. After all the chicks are loaded, the floor remains stationary until the broilers are to be withdrawn at which time the floor is driven from the operative to the inoperative position during which the broilers are transported out of the confinement area for subsequent shipment and processing.

Although these cages have many advantages, known systems also suffer several disadvantages. First, the flexible materials used for the floor material to facilitate the passage of droppings therethrough must be supported at a plurality of positions along the length of the material to prevent excessive sagging due to the weight of the poultry. Typically, this support is provided by bars extending under the floor material transverse to the direction of floor movement and carried on rollers in guide rails. This construction is relatively complicated and consequently expensive. Further, the pulling forces exerted on the endless loop to move the floor are borne entirely by the floor material, and since these pulling forces can be quite large when the floor is fully loaded with grown poultry broilers, stretching and/or damage to the floor material results or otherwise a strong and consequently expensive material is required. Further, because the material bears the full longitudinal force required to move the floor, perforations in the material allowing droppings to pass therethrough must be relatively small or few in number so as not to substantially weaken the material. However, this leads to excessive dropping accumulation on the floor, leading to breast blistering of the poultry and unsanitary conditions.

Second, each floor is typically driven by its own motor. As a practical matter, because all of the tiers terminate in a common open end of the battery, only one tier may be loaded or unloaded at a time. Consequently, the inclusion of one motor for each driven floor unnecessarily increases the cost of the cage.

Third, each tier must be provided with an access door through which poultry is introduced into and removed from the confinement area. However, because each floor is movable between an operative position and a lower, inoperative position, the door for each tier below the upper tier interferes with the movement of the floor immediately above as it passes into its inoperative position. To my knowledge, this problem has not been solved without creating another problem; for example the escape of poultry through any space between the door and the floor belt when the battery is loaded and the floor above it is in its operative confinement position.

SUMMARY OF THE INVENTION

The aforementioned problems are solved by the present invention. Essentially, a tiered, poultry broiler cage is provided having movable floors wherein the longitudinal forces required to move the floors are not transmitted to the floor material. This means for moving the floors also supports the same and includes two endless looped tension members located at each side of the cage with transverse support members attached to the tension members at spaced intervals. This construction enables a much wider array of materials to be used as the floor material. More particularly, a material may be used having a very significant open weave to facilitate the passage of droppings therethrough. Consequently, fewer droppings accumulate on the floor, reducing breast blistering and improving sanitation within the cage.

One material particularly well suited as a floor material in conjunction with the present invention is an elastically deformable, mesh material including a plurality of relatively narrow ribs defining a plurality of relatively larger apertures. More preferably, the ribs comprise load-bearing filaments encapsulated within a relatively soft material to provide the desired load-bearing characteristics and further reduce blistering of the poultry. The floor also eliminates the requirement that the transverse floor-supporting bars be carried on rollers on either end of each bar.

In another aspect of the invention, the floor driving mechanism includes a novel clutch means to enable the selective driving of all tier floors individually from a common motor. Consequently, assembly costs of the battery are greatly reduced due to the fact that only one motor need be included regardless of the number of cage tiers and associated movable floors.

In yet another aspect of the invention, each cage tier floor is movable between an operative position and lower inoperative position. A novel access door is provided on each tier below the upper tier, which door when in the open position lies entirely below the floor immediately above, but when in the closed position extends above the inoperative position. Consequently, the door when pivoted to its open position does not interfere with movement of the floor immediately above between its operative and inoperative position; however, in its closed position it securely maintains the poultry within the confinement area.

These and other objects, advantages, and features of the invention will be more fully understood and appreciated by reference to the written specification and appended drawings.

DESCRIPTION OF THE PREFERRED EMBODIMENT

Figure 1:
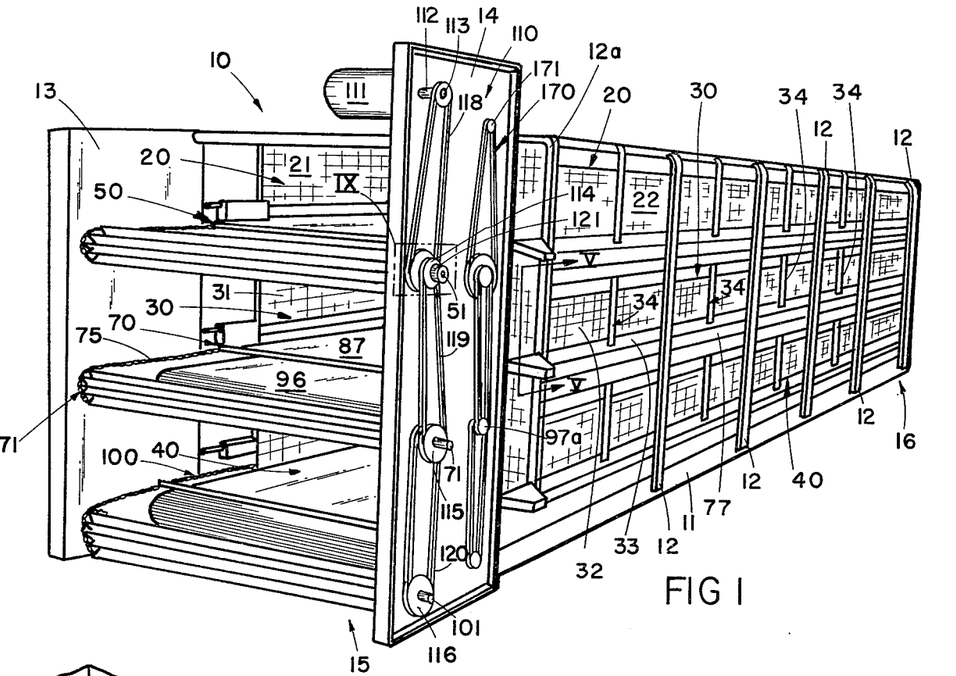
FIG. 1 is a perspective view of the poultry broiler cage of the present invention.

A poultry broiler cage in accordance with a preferred embodiment of the invention is illustrated in the drawings and generally designated 10. As seen in FIG. 1, cage 10 generally includes upper, middle, and lower tiers, or confinement areas, 20, 30, and 40, respectively, each having a movable floor 50, 70, and 100, respectively. Drive assembly 110 selectively drives one of movable floors 50, 70, and 100 to convey poultry into or out of the associated confinement area. Finally, pivoted gates 120 and 130 (FIGS. 10 and 11) and pivoted gate (not shown) are mounted at the forward ends of confinement areas 50, 70, and 100, respectively, to selectively allow access to the confinement areas.

Cage 10 (FIG. 1) includes a pair of base members 11 extending longitudinally of the cage and a plurality of vertical uprights 12 extending upwardly therefrom and in turn supporting confinement areas 20, 30, and 40. Cage 10 at its forward end 15 includes a pair of support partitions 13 and 14 generally parallel to one another and extending upwardly from base members 11. The opposite, rear end of cage 10 is denominated 16.

Figure 5:
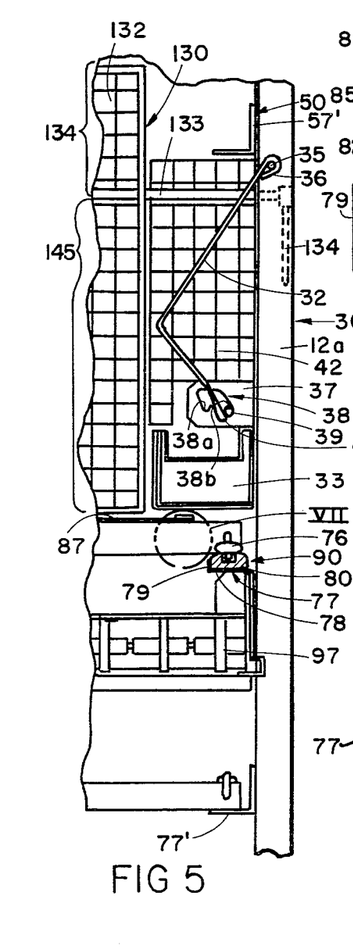
FIG. 5 is a fragmentary, sectional view of the middle tier of the poultry broiler cage taken along plane V—V in FIG. 1.

Confinement areas 20, 30, and 40 are generally identical to one another. Accordingly, only area 30 will be described in detail with areas 20 and 40 being the logical, equivalent extensions thereof. Middle confinement area 30 includes side walls 31 (FIG. 1) and 32 (FIGS. 1 and 5), fabricated from a wire mesh material and pivotally supported on uprights 12 using rod 35 (FIG. 5). Side 32 is generally L-shaped in cross section and includes an upper hooked end 36 through which rod 35 passes and a positioning bar 39 at its lower end 41. Feed trough 33 is located directly below side wall 32 and is secured to uprights 12. A bracket 37 is also secured to each of uprights 12 immediately above feed trough 33 and defines an inverted U slot 38 in which positioning bar 39 is positioned. Side 32 may be pivoted into one of two positions by positioning bar 39 within the inner leg 38a or outer leg 38b of slot 38. When bar 39 is located within inner leg 38a, only limited access to trough 33 is provided. This position is used when the poultry are small. However, when bar 39 is positioned in outer leg 38b, full access by larger poultry may be had to the trough. Preferably, a watering trough is also positioned in confinement area 30 adjacent wall 31 as is well known in the art. Mesh side piece 42 is secured to upright 12a and extends the full height between trough 33 and upper movable floor 50 and between upright 12a and door 140.

Figure 10:
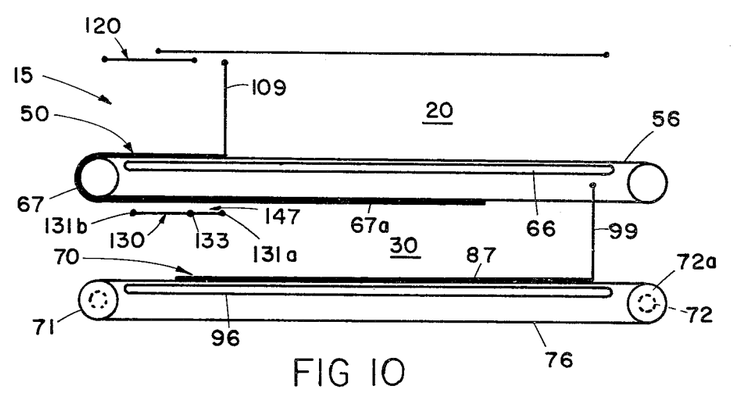
FIG. 10 is a schematic view of the upper and middle tiers with the access gates in their open position and the upper floor in its inoperative position.
Figures 11, 12, 13, 14, 15:
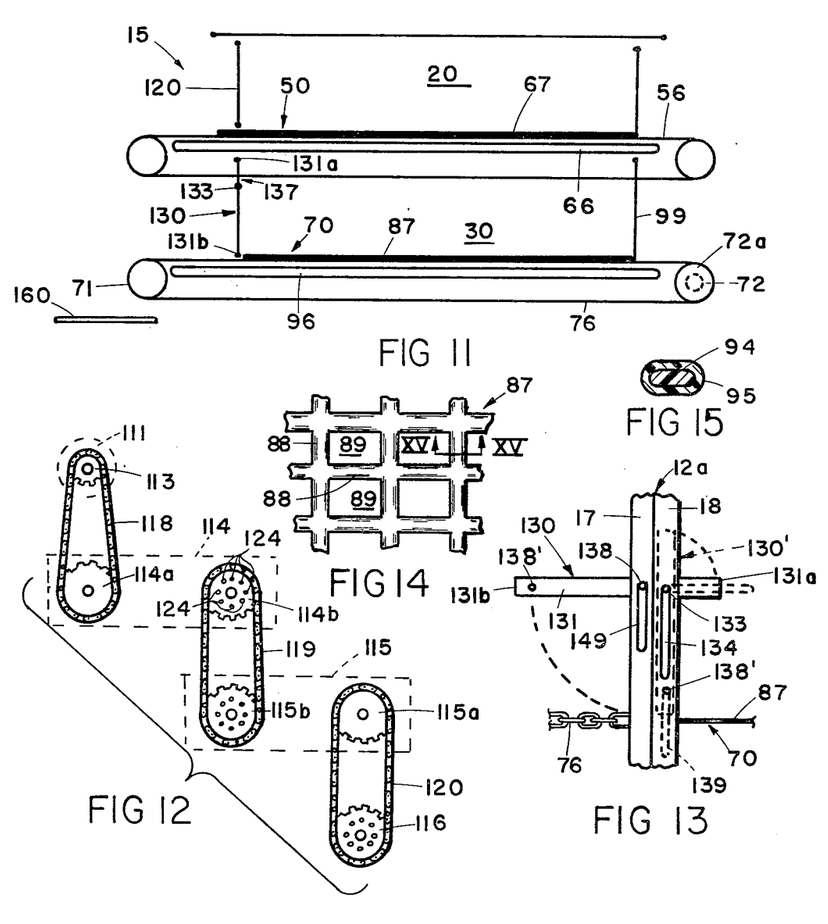
FIG. 11 is a schematic view of the upper and lower tiers with both floors in their operative positions and both gates closed.
FIG. 12 is an exploded, schematic view of the gearing for the floor-driving axles.
FIG. 13 is a fragmentary, side elevational view of the access door shown in FIG. 5.
FIG. 14 is a fragmentary, top plan view of the floor material.
FIG. 15 is an enlarged, sectional view taken along plane XV—XV in FIG. 14.

Movable floors 50, 70, and 100 are also generally identical to one another. Accordingly, only floor 70 will be described in detail, with floors 50 and 100 being the logical equivalent extensions thereof. Floor 70 includes drive member or axle 71 rotatably supported between partitions 13 and 14 (FIGS. 1 and 2) and rear support member or axle 72 (FIGS. 10 and 11). Sprockets 73 and 74 (FIG. 2) are fixedly mounted on opposite ends of axle 71 immediately proximate partitions 13 and 14, respectively. Likewise, sprocket 72a and another sprocket (not shown) are similarly mounted on rear axle 72. Chain 75 is formed into an endless loop and is secured about sprockets 73 and 72a. Similarly, chain 76 is formed into an endless loop about sprocket 74 and the other rear sprocket (not shown) on axle 72. Chains 75 and 76 are selected so that every other one of their links is engaged by one of the teeth on sprockets 73 and 74, respectively, so that the chains may be driven by rotating axle 71. Reinforcement fins 71' extend radially from axle 71 and are secured between sprockets 73 and 74.

Figure 4:
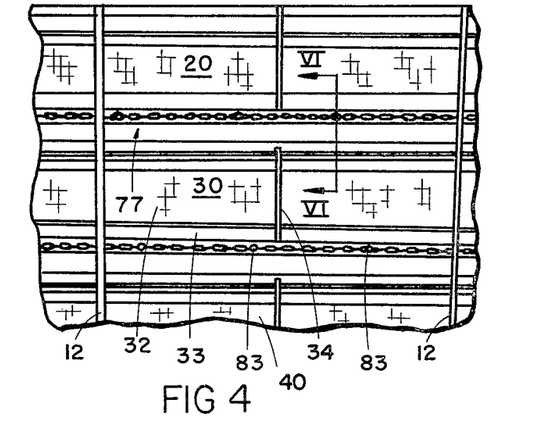
FIG. 4 is a fragmentary, side elevational view of the poultry broiler cage.

Support iron 77 (FIGS. 4, 5, and 8) extends the full length of cage 10 and is secured to vertical uprights 12. Support iron 77 includes a horizontal portion 78 (FIG. 5) and a vertical retaining flange 79 extending upwardly from the terminal edge thereof. Chain guide 80 (FIGS. 5 and 6) is secured to support iron 77, and more particularly on flange 78, and also extends the full length of cage 10. Preferably, chain guide 80 is fabricated from a material having a relatively low coefficient of friction, for example a plastic such as nylon or vinyl. Guide 80 includes an upwardly opening channel 81 (FIG. 6), generally square in cross section, and an upper load-bearing surface 82.

Figures 6, 7, 8, 9, 16, 17:
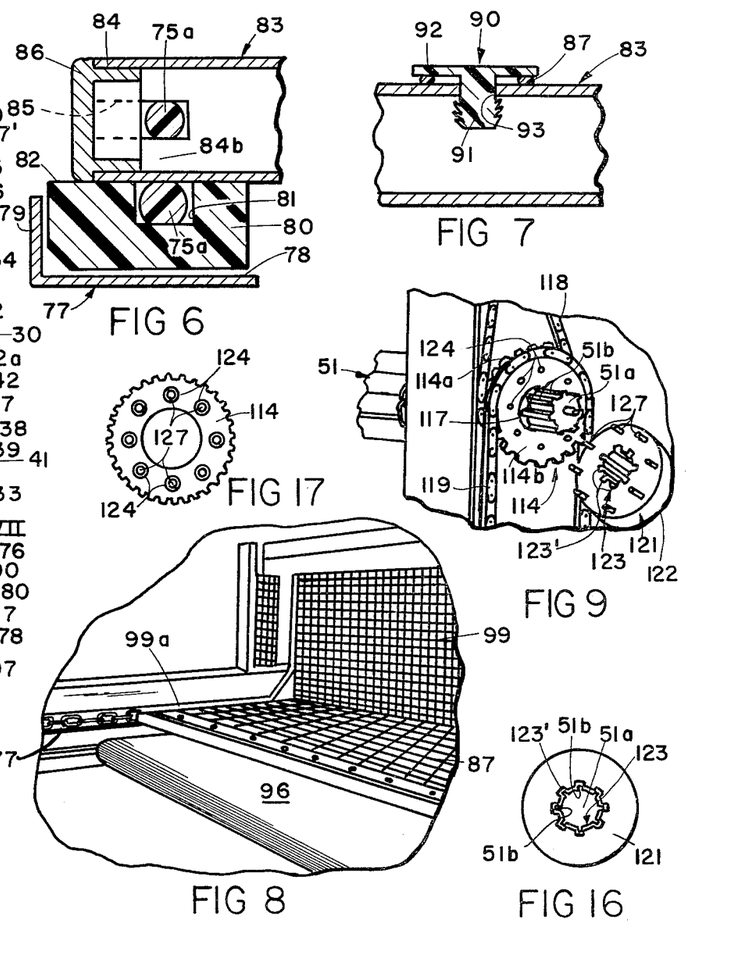
FIG. 6 is a fragmentary, sectional view taken along plane VI—VI in FIG. 4 showing an end of a support bar secured to a chain riding in a chain guide.
FIG. 7 is a fragmentary, sectional view of the area within line VII in FIG. 5.
FIG. 8 is a fragmentary, perspective view of the integral rear wall of a movable floor.
FIG. 9 is an enlarged view of the area within boundary lines IX in FIG. 1 with the grooved cap member removed from the splined axle and cocked to show its central, grooved opening.
FIG. 16 is a cross-sectional view of one of the clutch mechanisms like that illustrated in FIG. 9 taken at and along a plane perpendicular to the axis of the grooved connection between the cap and shaft.
FIG. 17 is a cross-sectional view of one of the clutch mechanisms like that of FIGS. 9 and 16 taken at and along a plane perpendicular to the pin connections between the cap and a sprocket.

A plurality of support bars 83 (FIGS. 2, 3, 4, 6, and 7) extend between and are secured to chains 75 and 76. Each of support bars 83 is an elongated, hollow member generally circular in cross section and includes a pair of opposed ends (FIG. 6). End 84 defines slot 85 extending longitudinally into bar 83 and having a width generally the same as the thickness of one of chain links 75a. Bar 83 is secured to chain link 75 by sliding slot 85 about chain link 75a so that lower portion 84b of bar end 84 actually passes through the center of link 75a. Bar 83 is secured in position by press fitting cap 86 into bar 84, entrapping link 75a within slot 85. The opposite end of bar 83 is secured to chain 76 in an analogous manner. Consequently, when chains 75 and 76 are moved longitudinally with respect to cage 10, support bars 83 are also transported longitudinally within the cage. Both chain 75 and bar ends 84 ride on chain guide 80 as will be described. A return rail 77' (FIG. 5) extends the full length of cage 10 below support rail 77 and is secured to vertical uprights 12 to support chain 76, bars 83, and floor material 87 in their inverted, lower, inoperative position.

Figure 2:
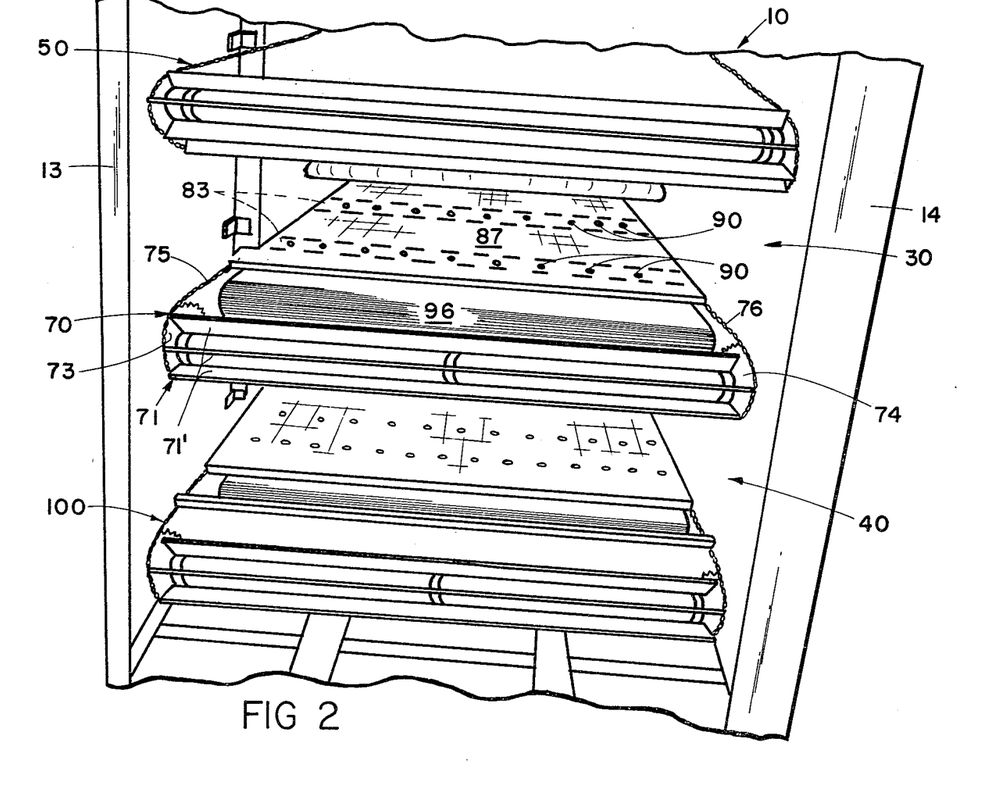
FIG. 2 is a fragmentary, perspective view of the loading area of the poultry broiler cage.
Figure 3:
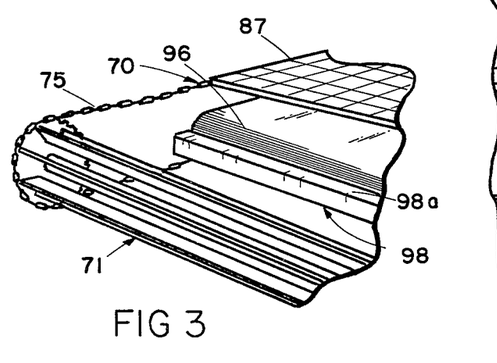
FIG. 3 is a fragmentary perspective view of the loading area of the middle tier of the poultry broiler cage.

Floor material 87 (FIGS. 1, 2, 3, 7, 8, 11, and 14) is supported on bars 83 in trampoline-like fashion and secured thereto. As most clearly shown in FIG. 14, material 87 is an elastically deformable, mesh comprising a plurality of ribs 88 defining a plurality of generally rectangular apertures 89. As seen in FIGS. 2 and 7, material 87 is secured to bars 83 using push fit plugs 90, each of which includes a barbed stem 91 and a relatively large diameter head 92. The diameter of head 92 is selected to be wider than apertures 89. A plurality of apertures 93 are located along the upper surface of each of bars 83. One of plugs 90, and more particularly barbed stem 91, extends through each of apertures 89 in material 87 to secure material 87 to bar 83. When plug 90 is installed, ribs 88 are entrapped between bar 83 and plug head 92. Material 87 comprises a load-bearing filament mesh 94 encapsulated within a soft material 95 (FIG. 15). In the preferred embodiment, the load-bearing filaments are fabricated from polyester, and the encapsulating material is a polyvinyl chloride having a relatively low durometer. Further in the preferred embodiment, each of ribs 88 is approximately 3 mm wide; and each of apertures 89 has a dimension of approximately 10 mm by 12 mm; the fabric has a weight of approximately 300 grams per square meter; and the ribs have a tensile strength of 120 kilograms per five centimeters.

Integral end wall 99 (FIGS. 8, 10, and 11) is mounted on chains 75 and 76 for movement therewith at the rear end of floor material 87. A pair of L-shaped brackets 99a are secured to and between the chains and end wall 99 to support the end wall in a generally perpendicular relationship to floor material 87.

A manure belt 96 (FIGS. 1, 2, 3, 5, 8, 10, and 11) is formed into an endless belt and supported on a plurality of rollers 97 (FIG. 5) located at a plurality of positions along the length of cage 10. Forwardmost roller 97a (FIG. 1) is driven by drive assembly 170 to operate belt 96, and convey droppings accumulated thereon out of the confinement area. Assembly 170 drives all of the manure belts together. A L-shaped scraper 98 (FIG. 3) is supported between partitions 13 and 14 and has one of its legs 98a biased against the manure belt as it passes over roller 97 to aid in removing droppings from the belt as is well known to those having ordinary skill in the art.

The means for driving and moving the floors is best disclosed in FIGS. 1, 9, and 12 wherein drive assembly 110 is shown supported on the end panel or partition 13. As disclosed in FIG. 1 the motor and gear reducer assembly 111 drives shaft 12 which in turn is operatively connected by means of sprocket 113 through chains 118, 119, and 120 to the sprocket assemblies 114, 115, and 116. Each of these assemblies are freely rotatable about its associated axles 51, 71, and 102, respectively, and when the motor of assembly 110 is running the sprocket assemblies 114, 115, and 116 are rotated. However, the sprocket assemblies are capable of being selectively locked to their associated axle by the clutch cap 121 causing the motor assembly 110 to drive the floor associated with such axle.

FIGS. 9, 12, 16, and 17 disclose the details of the clutch mechanism, it being understood that FIGS. 9, 16, and 17 disclose only the mechanism for axle 51 since the structure of the clutch mechanisms for axles 71 and 101 will be evident therefrom. Referring to FIGS. 9 and 12, reference numbers 114a and 114b designate sprockets connected together and forming the double row sprocket assembly 114. Chain 118 engages sprocket 114a to drive the sprocket assembly and chain 119 engages sprocket 114b so as to drive sprocket assembly 115. Sprocket assembly 114 is freely rotatably mounted on the end portion 51a of axle 51 and is held thereon by retainer ring 117. The end portion 51a includes a plurality of splines 51b.

Clutch cap 121 (FIG. 9) is provided to lock sprocket assembly 114 to the axle 51. This is accomplished by the central grooved aperture 123 in cap 121, the grooves being designated by reference numeral 123' and adapted to receive the splines 51b. Further, cap 121 has a plurality of radially spaced pins 127 extending from its inner face and which are adapted to be received in the pin apertures 124 in the outer side of sprocket 114b. Thus, when cap 121 is inserted over the end 51a of axle 51, the sprocket assembly 114 is locked to axle 51 causing motor assembly 110, when operated, to drive the axle 51 and its associated floor.

Now referring to FIG. 12 which diagramatically demonstrates the relationship between the various sprocket assemblies, it will be noted that as described above, sprocket 114b is operatively connected to sprocket 115b and sprocket 115a to sprocket 116. Thus, whenever sprocket 113 is driven by operation of motor 111, all the sprockets are rotating; however, none of the axles 51, 71, and 101 are rotated until clutch cap 121 is fitted over the end of one of the axles. When so fitted, the cap 121 couples the selected sprocket assembly 114, 115, or 116 to its associated axle 51, 71, or 101, respectively.

As previously set forth, when all the poultry have been loaded on one of the confinement areas such as areas 20 and 30 (FIGS. 1 and 4), the doors 120 and 130, respectively, are provided to close off the ends of the confinement areas. As disclosed in FIGS. 10 and 11, door 120 is pivoted along its top edge. However, door 130 has a unique construction and pivotal arrangement. It includes a generally rectangular frame 131 (FIGS. 5 and 13) having an upper edge 131a and a lower edge 131b and supporting a generally planar wire mesh material 132 thereon (FIG. 5). A generally horizontal pivot rod 133 secured to the side of door 130 extends through frame 131 and vertical upright member 12a. As most clearly seen in FIG. 5, rod 133 is located between upper edge 131a and lower edge 131b of the door and is pivoted below the floor 67a when it is in its inoperative position so that when pivoted by handle 134 to the horizontal position (FIG. 10) sufficient clearance is provided for the floor to be positioned thereover. This permits the upper movable floor 50 to freely move between its operative and inoperative positions above the open door. However, when door 130 is pivoted to its closed, vertical position (FIG. 11) the door prevents access to or exit from confinement area 30 since upper edge 131a is located above the inoperative position of movable floor 50 and more preferably proximate manure belt 66, lower edge 131b is located proximate the middle movable floor 70.

FIG. 13 shows the locking mechanism for door 130. Vertical upright 12a is in actuality a pair of side-by-side uprights 17 and 18. Pivot rod 133 extends through vertical upright member 18. Door 130 is shown in its open position, with the closed position shown in phantom. When door 130 is pivoted to its open, substantially horizontal position by turning handle 134, a pair of apertures 138 in frame 131 and vertical upright member 17 align with one another so that L-shaped key 139 may be inserted therethrough to hold the door in this position. When key 139 is removed from apertures 138, door 130 pivots to its closed, substantially vertical position, wherein apertures 138' in frame 131 and vertical upright member 18 align. Key 139 may then be inserted through aligned apertures 138' to lock door 130 in its closed position.

OPERATION

Cage 10 is most efficiently loaded with chicks beginning with upper confinement area 20 and proceeding thereafter to middle area 30 and finally lower area 40. To prepare the confinement areas for loading, all of the access doors, for example 130, are pivoted to their open, horizontal position (FIG. 10) and locked, for example by inserting key 139 through aligned apertures 138. Movable floor 50 is moved to its inoperative position (FIG. 10) with end wall 109 generally proximate access door 120. If floor 50 is not in this position when the loading operation is to begin, clutch cap 121 is installed on axle 51 so that grooved central opening 123 interfits with splined axle 51a and studs 127 extend into sprocket holes 124 in sprocket assembly 114 (see also FIG. 9) locking axle 51 to sprocket 114. Motor 111 is then actuated so that sprocket assembly 113 rotates in a counterclockwise direction (all directions of rotation taken with respect to FIG. 1) so that sprocket assembly 114 and axle 51 rotate in unison in a counterclockwise direction, moving end wall 109 toward forward end 15 of cage 10 until in the position shown in FIG. 10. At this point, a majority 67a of upper floor material 67 is in an inoperative, inverted, lower position. Side walls 21 and 22 are moved inwardly toward one another to prevent chicks from falling into the feed and water troughs.

It should be noted that when drive shaft 112 and drive sprocket 113 are driven in a given direction, sprocket assemblies 114, 115, and 116, which are directly connected to drive sprocket 113 through chains 118, 119, and 120, all rotate in that same direction.

To load upper area 20, motor 111 is driven in a clockwise direction so that sprocket 113, sprocket assembly 114 and axle 51 are driven in a clockwise direction moving end wall 109 away from forward end 15 and conveying floor material 67 into its operative position (see FIG. 11). As floor 50 is conveyed beyond open end 15 into confinement area 20, chicks are spread on floor material 67 and carried into the confinement area with the movable floor. When floor 50 is in its fully operative position as shown in FIG. 11, access door 120 is pivoted downwardly into its closed, vertical position confining the chicks within area 20.

To load confinement area 30, access door 130 is left in its open, horizontal position as shown in FIG. 10. Clutch cap 121 is then removed from axle end 51a and positioned over axle end 71a to lock double row sprocket assembly 115 and axle 71 together. Motor 111 is then actuated to drive sprocket 113 in a counterclockwise direction, which drives sprocket assembly 115 and axle 71 also in a counterclockwise direction through chains 118 and 119 and sprocket assembly 114 to withdraw floor material 87 from confinement area 30 until end wall 99 is proximate access door 130. Side walls 31 and 32 are then moved inwardly to prevent chicks from falling into feed trough 33 and the water trough. Wall 32 is so positioned by placing bar 39 in inner leg 38a of slot 38.

Motor 111 is then reversed, driving sprocket 113 in a clockwise direction, which through chains 118 and 119 and sprocket assembly 114 also drives sprocket assembly 115 and axle 71 in a clockwise direction, moving end wall 99 to the rear of confinement area 30. As floor material 87 is conveyed past forward end 15 and into the confinement area, chicks are placed on the floor supporting material and carried into the confinement area with the floor. When floor 70 has been moved to its fully operative position (FIG. 11), key 139 is withdrawn from apertures 138 so that access door 130 can pivot into its closed, vertical position about rod 133. Key 139 is then inserted through apertures 138' to lock the door in position. When fully closed, lower edge 131b of door 130 is proximate floor material 87 and upper edge 131a of the door is proximate upper manure belt 66. Consequently, access door 130, end wall 99, and side walls 31 and 32 secure the chicks within the confinement area.

The same procedure as immediately above described is repeated for filling the lower confinement area 40.

It should be understood that in the above filling operation, as axle 71 is driven in a clockwise direction, chain sprockets 73 and 74 engage chains 75 and 76, respectively to draw floor material 87 into confinement area 30. Because chains 75 and 76 ride on low friction guide channels 80, the movement of the chains is greatly facilitated.

As seen in FIG. 6, bar ends 84 also ride on upper surface 82 of low friction channel 80 to further reduce drag on moving floor 70. The lower half of every other chain link 75 is positioned within channel 81 to properly orient the chain on the channel. Because support bars 83 are secured to and between chains 75 and 76, the longitudinal forces required to move the floor are borne by chains 75 and 76 and support bars 83, and not to floor material 87. Consequently, the floor material is not stretched or damaged and need not be strong enough to withstand the longitudinal forces required to move the loaded floor into and out of the confinement area. This enables the use of a fabric material having a relatively large mesh (see FIG. 14) to facilitate the passage of droppings therethrough and onto manure belt 96. Further, because material 87 is encapsulated within a polyvinyl chloride 95, droppings do not adhere to floor material 87, additionally facilitating the passage of droppings. Because droppings do not significantly accumulate on floor material 87, breast blistering of the poultry is reduced.

The poultry is left within confinement areas 20, 30, and 40 until fully grown. Water and feed are introduced into the cage in any conventional manner through feed trough 33 and the water trough (not shown) to provide nourishment to the poultry. The sides of the confinement areas are moved outwardly after the poultry has attained a certain size to allow greater access to the feed troughs. Droppings pass through floors 50, 70, and 100 onto the manure belts 66 and 96. Periodically, drive assembly 170 is actuated to convey manure to the forward end 15 of cage 10 where the manure may be collected. Manure scrapers, for example 98 (FIG. 3) facilitate removal of the manure from the belts.

When the poultry is fully grown, the movable floors are driven in a reverse direction to move the poultry out of the confinement areas and onto a transverse conveyor 160 (see FIG. 11) for subsequent processing. Preferably, conveyor 160 is suspended from the ceiling of the poultry house so that the conveyor may be positioned proximate any one of axles 51, 71, and 101.

Preferably, lower confinement area 40 is first unloaded in a manner analogous to confinement area 30, which will now be described in relation to area 30 and access door 130. Access door 130 of confinement area 30 is pivoted to its open, horizontal position by first withdrawing key 139 from aligned apertures 138' and rotating handle 134 causing door 130 to also rotate. When apertures 138 in vertical upright member 17 and door frame 131 are aligned, key 139 is inserted therethrough to maintain the door in its open position. Clutch cap 121 is then slid onto the splined axle end so that studs 127 are positioned in sprocket holes 125, and motor 111 is actuated to drive sprocket 113 in a counterclockwise direction, which through chains 118 and 119 and sprocket assembly 114 also drives sprocket assembly 115 and axle 71 in a counterclockwise direction. This moves floor material 87 out of confinement area 30 and past forward end 15 to deposit the poultry on transverse belt 160. End wall 99 moves with floor 70 to urge the poultry out of the confinement area. When floor 70 is moved to its fully inoperative position with end wall 99 proximate door 130, a few birds will remain on floor material 87 located between end wall 99 and axle 71. These birds may be removed by shooing them onto transverse conveyor 160 or by physically picking them up and placing them on the conveyor. Transverse conveyor 160 is then placed immediately adjacent and slightly below axle 51 and confinement area 20 is unloaded in a similar manner. When middle access door 140 is in its open, horizontal position, floor material 67a is free to pass immediately above the door between the operative and inoperative positions.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A confinement area for rearing poultry including opposed sides and a floor movable longitudinally with respect to said confinement area to load poultry into and unload poultry out of said confinement area, wherein the improvement comprises:
    first and second generally horizontal support rails secured generally opposite one another to said opposed sides of said confinement area;
    first and second tension pulling means extending along said first and second rails, respectively;
    means for moving said first and second tension means longitudinally with respect to said rails;
    means for guiding said tension pulling means on a path along said rails, said guide means including a plurality of support bars each extending between and secured to said first and second tension pulling means; and
    a flexible poultry-supporting floor material supported in trampoline-like fashion between at least one of said support bars and tension pulling means, whereby movement of said tension pulling means moves the floor material and further whereby longitudinal pulling forces are borne by said tension pulling means rather than said flexible floor.

2. A battery for rearing poultry as defined in claim 1 wherein said first and second tension pulling means are formed into endless loops to convey said poultry-supporting material between an operative position and a lower, inverted, inoperative position.

3. A battery for rearing poultry as defined in claim 2 further comprising third and fourth rails positioned directly below said first and second rails, respectively, for supporting the support bar ends and tension pulling means in their inoperative, inverted positions.

4. A confinement area for rearing poultry including opposed sides and a floor movable longitudinally with respect to said confinement area to load poultry into and unload poultry out of said confinement area, wherein the improvement comprises said movable floor comprising:
    first and second generally horizontal support rails secured generally opposite one another to said opposed sides of said confinement area, said support rails comprising a material having a generally low coefficient of friction;
    first and second chain means riding on said first and second rails, respectively, and supported by said low friction material;
    means for moving said first and second chain means longitudinally with respect to said rails;
    a plurality of support bars each extending between and secured to said first and second chain means; and
    a flexible poultry-supporting material supported in trampoline-like fashion on and secured to at least one of said support bars and said chain means, whereby forces exerted on said movable floor are borne primarily by said chain means.

5. A battery for rearing poultry as defined in claims 1 or 4 wherein said poultry supporting material is secured to said support bars by a plurality of fasteners extending through said poultry-supporting material and secured in said support bars.

6. A battery for rearing poultry as defined in claim 4 wherein each of said support bars comprise first and second opposite ends and wherein said first and second opposite ends are supported by said low friction material of said first and second support rails, respectively.

7. A battery for rearing poultry as defined in claims 4 or 6 wherein said first and second support rails are grooved and wherein said first and second chain means ride in said grooves.

8. A battery for rearing poultry as defined in claim 7 wherein each end of each support bar defines a slot and one link of said chain is positioned within each of said slots.

9. A battery for rearing poultry as defined in claim 4 wherein said first and second chain means are formed into endless loops to convey said poultry-supporting material between an operative position and a lower, inverted, inoperative position.

10. A battery for rearing poultry as defined in claim 8 further comprising third and fourth rails positioned directly below said first and second rails, respectively, for supporting the support bar ends and chain means in their inoperative, inverted positions.

11. A battery for rearing poultry comprising:

an upper cage tier including a floor movable along a path between an operative poultry supporting, upper, planar position and an inoperative, inverted lower planar position, said inoperative, lower planar position being below said operative, upper, planar position;

a lower cage tier located directly below said upper cage tier, said lower cage tier including a floor and an open forward end;

a door including an upper edge and a lower edge; and means for pivotally mounting said door in said open forward end about a generally horizontal axis, said axis being located below the inoperative, lower, planar position and between said upper and lower edges of said door, whereby when said door is pivoted into an open, generally horizontal position, said door is oriented generally horizontally to said planar positions so as to not interfere with movement of said upper cage floor into and out of said inoperative position; said location of said axis on said door being such that when said upper cage floor is moved into its operative position and said door is pivoted into a closed, generally vertical position, said upper edge of said door is located above said inoperative, lower planar position of said upper floor and said lower edge of said door is located proximate said lower tier floor to aid in retaining poultry within said lower cage.

12. A battery for rearing poultry as defined in claim 11 further comprising means for collecting droppings from said upper tier, said collecting means being located between said upper and lower planar positions and wherein said upper edge of said door is located proximate said collecting means when said door is in said closed position.

13. A battery for rearing poultry as defined in claim 11 further comprising means for selectively locking said door in said open and closed positions.

14. A battery for rearing poultry as defined in claim 13 wherein said locking means comprises:

said battery having a frame located adjacent said door;

said frame and said door defining a first pair of apertures aligned when said door is in said open position;

said frame and said door defining a second pair of apertures aligned when said door is in said closed position;

and pin means selectively insertable through said first and second pairs of aligned apertures.

15. An improved confinement area for poultry including a floor supported in trampoline-like fashion, wherein the improvement comprises said floor comprising an elastically deformable, mesh material including a plurality of ribs defining a plurality of apertures wider than said ribs through which droppings can pass, each of said ribs comprising a woven polyester load-bearing filament encased within a relatively low durometer polyvinylchloride to reduce blistering on poultry within said cage.

16. A cage for poultry as defined in claim 15 wherein said ribs are approximately three millimeters wide and wherein each of said apertures is approximately ten by twelve millimeters.

17. A cage for poultry as defined in claim 15 wherein the tensile strength of said ribs is approximately one hundred twenty kilograms per five centimeters.

18. A battery for rearing poultry comprising:
a rotatable drive shaft;
at least first and second rotatable axles;
a first movable cage floor movable in response to rotation of said first axle;
a second movable cage floor movable in response to rotation of said second axle;
a first driven member operatively connected to said drive shaft and freely rotatable with respect to said first axle;
a second driven member operatively connected to said drive shaft and freely rotatable with respect to said second axle; and
first coupling means for selectively locking either said first driven member to said first axle or said second driven member to said second axle, whereby said first and second cage floors can be selectively moved.

19. A battery for rearing poultry as defined in claim 18 wherein said first and second driven members are rotatably mounted on ends of said first axle and second axle, respectively, and wherein said coupling means comprises:

a cap defining a central opening dimensioned to fit about and lock to an end portion of either said first or second axle;

second coupling means for maintaining said cap and said first driven member in fixed angular relation when said cap is fitted about and locked to said first axle; and third coupling means for maintaining said cap and said second driven member in fixed angular position when said cap is fitted about and locked to said second axle.

20. A battery for rearing poultry as defined in claim 19 wherein said second and third coupling means comprises:

one of said cap or said first and second driven members having aperture means; and a pin means extending from said other of said cap or said first and second driven members into said apertures.

21. A battery for rearing poultry as defined in claim 19 further comprising:

a longitudinal spline means extending radially from said portions of said first and second axles; and said cap defining a groove means in said central opening dimensioned to receive said spline means.

22. A battery for rearing poultry as defined in claim 21 wherein said second and third coupling means comprises:

one of said cap or said first and second driven members having aperture means; and a pin means extending from said other of said cap or said first and second driven members into said apertures.

23. A battery for rearing poultry as defined in claims 18, 19, or 25 wherein said first and second driven members comprise sprocket means and wherein the operable connection between the first driven member and the drive shaft includes chain means.

24. A battery for rearing poultry as defined in claim 23 wherein:

said first driven member comprises a first double row sprocket;

said second driven member comprises at least one second sprocket; and said operable connection between said second sprocket of said second driven member and said drive shaft includes a second chain mounted about one of said sprockets of said double row sprocket and said second sprocket.

* * * * *

UNITED STATES PATENT AND TRADEMARK OFFICE
CERTIFICATE OF CORRECTION

PATENT NO. : 4,437,433

DATED : March 20, 1984

INVENTOR(S) : W. A. J. Nijhof

It is certified that error appears in the above-identified patent and that said Letters Patent is hereby corrected as shown below:

Abstract, line 16:
"fasion" should be --fashion--;

Column 4, line 19:
"140" should be --130--;

Column 5, line 58:
"12" should be --112--;

Column 5, line 62:
"102" should be --101--;

Column 8, line 40:
"to" should be --by--;

Column 9, line 35:
"140" should be --130--;

Column 10, claim 2, line 5:
"battery" should be --confinement area--;

Column 10, claim 3, line 10:
"battery" should be --confinement area--;

Column 10, claim 5, line 40:
"battery" should be --confinement area--;

Column 10, claim 6, line 45:
"battery" should be --confinement area--;

UNITED STATES PATENT AND TRADEMARK OFFICE
CERTIFICATE OF CORRECTION

PATENT NO. : 4,437,433
DATED : March 20, 1984
INVENTOR(S) : W. A. J. Nijhof

It is certified that error appears in the above-identified patent and that said Letters Patent is hereby corrected as shown below:

Column 10, claim 7, line 50:
"battery" should be --confinement area--;

Column 10, claim 8, line 54:
"battery" should be --confinement area--;

Column 10, claim 9, line 58:
"battery" should be --confinement area--;

Column 10, claim 10, line 63:
"battery" should be --confinement area--;

Column 10, claim 10, line 63:
"8" should be --9--;

Column 11, claim 16, line 60:
"cage" should be --confinement area--;

Column 11, claim 17, line 64:
"cage" should be --confinement area--;

Column 11, claim 18, line 67:
"battery" should be --confinement area--;

Column 12, claim 18, line 2:
after the first occurrence of "movable" delete "cage";

Column 12, claim 18, line 4:
after the first occurrence of "movable" delete "cage";

UNITED STATES PATENT AND TRADEMARK OFFICE
CERTIFICATE OF CORRECTION

PATENT NO. : 4,437,433
DATED : March 20, 1984
INVENTOR(S) : W. A. J. Nijhof

It is certified that error appears in the above-identified patent and that said Letters Patent is hereby corrected as shown below:

Column 12, claim 18, line 14:
        after "second" delete --cage--;

Column 12, claim 19, line 16:
        "battery" should be --confinement area--;

Column 12, claim 20, line 32:
        "battery" should be --confinement area--;

Column 12, claim 21, line 39:
        "battery" should be --confinement area--;

Column 12, claim 22, line 45:
        "battery" should be --confinement area--;

Column 12, claim 23, line 53:
        "battery" should be --confinement area--;

Column 12, claim 23, line 54:
        "25" should be --22--; and

UNITED STATES PATENT AND TRADEMARK OFFICE
CERTIFICATE OF CORRECTION

PATENT NO. : 4,437,433

DATED : March 20, 1984

INVENTOR(S) : W. A. J. Nijhof

Page 4 of 4

It is certified that error appears in the above-identified patent and that said Letters Patent is hereby corrected as shown below:

Column 12, claim 24, line 57:
"battery" should be --confinement area--.

Title page, Item [21] Application No.: "342,889"
should read -- Application No.: --342,899--.

Signed and Sealed this

Nineteenth Day of February 1985

[SEAL]

Attest:

DONALD J. QUIGG

*Attesting Officer*   *Acting Commissioner of Patents and Trademarks*